(12) United States Patent
Aoyagi et al.

(10) Patent No.: US 10,759,366 B2
(45) Date of Patent: Sep. 1, 2020

(54) VEHICLE CONTROL DEVICE AND VEHICLE CONTROL METHOD

(71) Applicant: Mitsubishi Electric Corporation, Tokyo (JP)

(72) Inventors: Takahisa Aoyagi, Tokyo (JP); Noritaka Kokido, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 248 days.

(21) Appl. No.: 15/665,907

(22) Filed: Aug. 1, 2017

(65) Prior Publication Data

US 2018/0265020 A1 Sep. 20, 2018

(30) Foreign Application Priority Data

Mar. 14, 2017 (JP) .................................. 2017-048324

(51) Int. Cl.
*B60R 16/03* (2006.01)
*B60N 2/00* (2006.01)
(Continued)

(52) U.S. Cl.
CPC .............. *B60R 16/03* (2013.01); *B60N 2/002* (2013.01); *B60R 25/24* (2013.01); *G07C 5/10* (2013.01); *Y02T 10/92* (2013.01)

(58) Field of Classification Search
CPC ......... B60R 16/03; B60R 25/24; B60N 2/002; Y02T 10/92; G07C 5/10
See application file for complete search history.

(56) References Cited

U.S. PATENT DOCUMENTS

2011/0068895 A1* 3/2011 Gee .......................... B60R 25/00
340/5.67
2014/0088794 A1* 3/2014 Yashiro .................. G08C 17/02
701/2
(Continued)

FOREIGN PATENT DOCUMENTS

JP 2006-256374 A 9/2006
JP 2007-191015 A 8/2007
(Continued)

OTHER PUBLICATIONS

Communication dated Jan. 9, 2018 issued by the Japanese Patent Office in counterpart application No. 2017-048324.

*Primary Examiner* — Peter D Nolan
(74) *Attorney, Agent, or Firm* — Sughrue Mion, PLLC; Richard C. Turner

(57) ABSTRACT

Provided are a vehicle control device and a vehicle control method for keeping necessary functions effective until an occupant gets out of a vehicle. The vehicle control device include a vehicle exit detection part configured to detect a timing at which the occupant gets out of the vehicle, in accordance with a vehicle exit detection signal from a vehicle exit detector set in advance, and a power supply control part configured to control, when the timing at which the occupant gets out of the vehicle is detected by the vehicle exit detection part, a power supply control device so as to carry out any one of: shutting off a power supply to an in-vehicle device installed on the vehicle, thereby bringing the in-vehicle device into a stop state; and supplying a standby voltage to the in-vehicle device, thereby bringing the in-vehicle device into a sleep state.

8 Claims, 10 Drawing Sheets

(51) Int. Cl.
  *B60R 25/24*    (2013.01)
  *G07C 5/10*     (2006.01)

(56) References Cited

U.S. PATENT DOCUMENTS

| | | | | |
|---|---|---|---|---|
| 2015/0257125 A1* | 9/2015 | Iwamoto | ............... | H04W 68/00 |
| | | | | 455/414.1 |
| 2016/0036964 A1* | 2/2016 | Barfield, Jr. | ............ | H04W 4/02 |
| | | | | 455/418 |
| 2016/0250967 A1* | 9/2016 | Lee | ......................... | B60Q 3/80 |
| | | | | 315/79 |

FOREIGN PATENT DOCUMENTS

| | | | | |
|---|---|---|---|---|
| JP | 2009-83527 | A | | 4/2009 |
| JP | 2009-83618 | A | | 4/2009 |
| JP | 2009083618 | A | * | 4/2009 |
| JP | 2011-113366 | A | | 6/2011 |
| WO | 2005/069675 | A1 | | 9/2007 |

\* cited by examiner

| FLAG NAME | DETECTION SUBJECT |
|---|---|
| F1 | DOOR OPENING/CLOSING |
| F2 | DOOR LOCK |
| F3 | SMART KEY RECEPTION |
| F4 | DRIVER SENSING CAMERA |
| F5 | SEAT PRESSURE SENSOR |

VEHICLE CONTROL DEVICE AND VEHICLE CONTROL METHOD

BACKGROUND OF THE INVENTION

1. Field of the Invention

The present invention relates to a vehicle control device and a vehicle control method, and more particularly, to a timing at which power supplies to in-vehicle devices are stopped when an occupant stops a vehicle and gets out of the vehicle.

2. Description of the Related Art

In a case where an occupant stops functions of in-vehicle devices of a vehicle and gets out of the vehicle, when a key is turned backward, first, an ignition power supply (IG power supply) state is turned off and switched to an accessary power supply (ACC power supply) state in which a drive system and other systems constructed by an engine, a motor, and the like are turned off. In this state, electric power is still supplied to a car navigation system, an audio system, an ADAS, and other systems, which are in-vehicle devices, and thus those systems can still be used. When the key is turned backward further, the accessary power supply state is turned off, and the power supplies to the respective in-vehicle devices and an entire vehicle control device are turned off. When the accessary power supply state (ACC) is turned off, the functions of the in-vehicle devices installed on the vehicle stop in general.

For example, in blind spot warning or monitoring (BSW, rear and side vehicle detection alarm) for detecting a vehicle approaching from the rear and issuing an alarm, an alarm is issued for vehicles approaching from the rear and the side during travel, but an alarm is not issued for those vehicles when the accessory power supply state (ACC) is turned off. Thus, when the occupant gets out of the vehicle after the accessary power supply state (ACC) is turned off, an opened door of the vehicle may hit a vehicle approaching from the rear.

In Japanese Patent Application Laid-open No. 2006-256374, a power supply to a CPU can be turned off by an installed timer when a period set in advance has elapsed since an accessory power supply state (ACC) is turned off. However, the control is carried out only by the timer, and hence whether or not an occupant has got out of the vehicle is not determined. Thus, the power supply to the CPU may be turned off before the occupant gets out of the vehicle.

SUMMARY OF THE INVENTION

The present invention has been made to solve the above-mentioned problem, and has an object to provide a vehicle control device and a vehicle control method for keeping necessary functions effective until an occupant gets out of the vehicle.

According to one embodiment of the present invention, there are provided a vehicle control device and the like including: a vehicle exit detection part configured to detect a timing at which an occupant gets out of a vehicle in accordance with a vehicle exit detection signal from a vehicle exit detector set in advance; and a power supply control part configured to control, when the timing at which the occupant gets out of the vehicle is detected by the vehicle exit detection part, a power supply control device so as to carry out any one of: shutting off a power supply to an in-vehicle device installed on the vehicle, thereby bringing the in-vehicle device into a stop state; and supplying a standby voltage to the in-vehicle device, thereby bringing the in-vehicle device into a sleep state.

According to the present invention, it is possible to provide the vehicle control device and the vehicle control method for keeping necessary functions effective until the occupant gets out of the vehicle.

DESCRIPTION OF THE EMBODIMENTS

In a vehicle control device and a vehicle control method according to the present invention, whether or not an occupant has got out of a vehicle is detected, and a state in which desired devices are activated is maintained until the occupant gets out of the vehicle. As a result, for example, a BSW does not stop its function, and can be used until the occupant gets out of the vehicle, thereby enabling issuance of an alarm for vehicles approaching from the rear and side of the vehicle when the occupant gets out of the vehicle and a door of the vehicle is opened and closed.

Now, the vehicle control device and the vehicle control method according to an embodiment of the present invention are described referring to the accompanying drawings. In the embodiment, the same components or corresponding components are denoted by the same reference symbols, and the overlapping description thereof is herein omitted.

Embodiment 1

Figure 1:
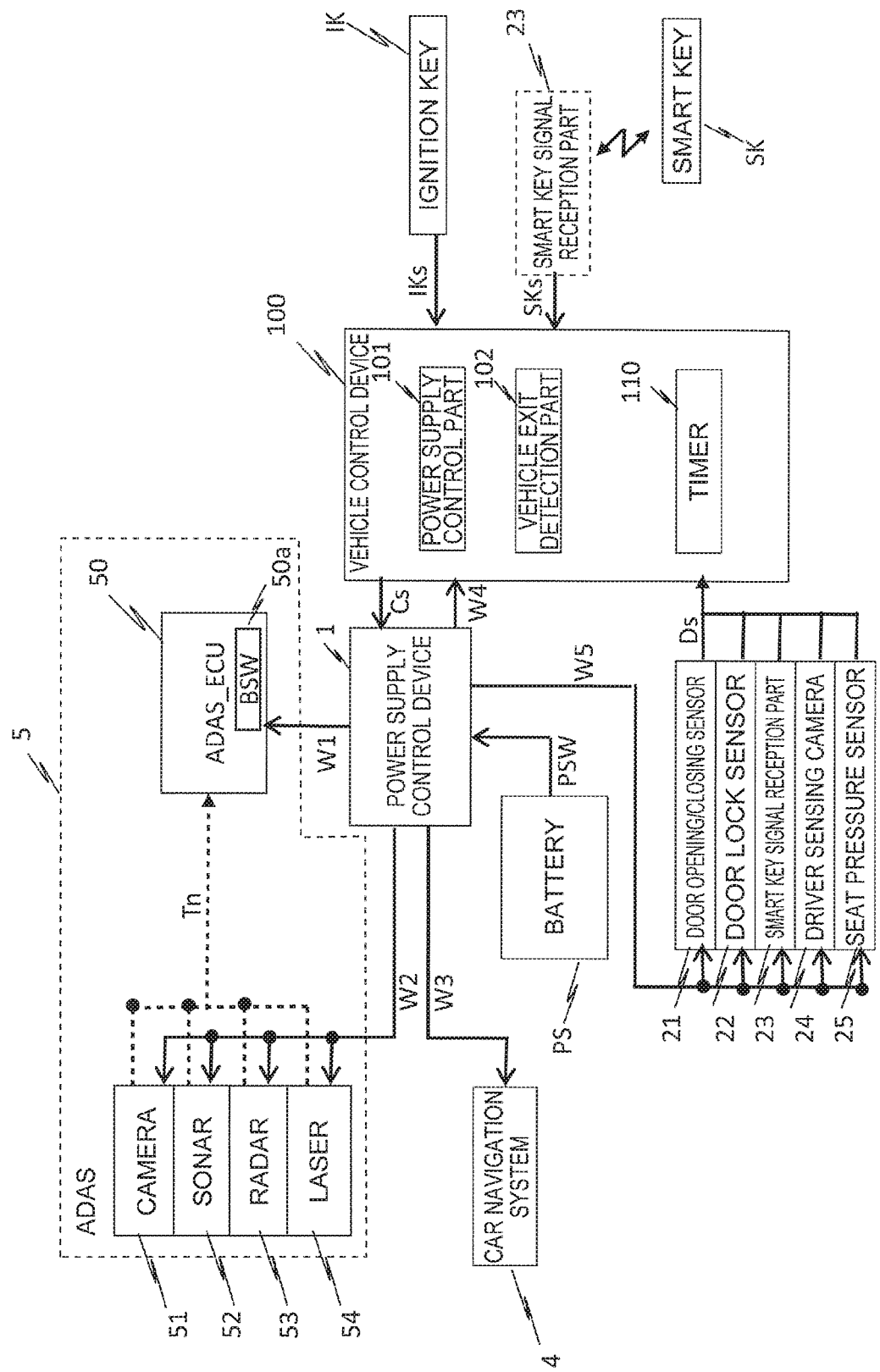
FIG. 1 is a diagram for illustrating an example of a configuration of a vehicle control system including a vehicle control device according to an embodiment of the present invention.

FIG. 1 is a diagram for illustrating an example of a configuration of a vehicle control system including the vehicle control device according to the embodiment of the present invention.

An advanced driving assistant system (ADAS) 5 and a car navigation system 4 are in-vehicle devices.

The ADAS 5 includes detectors such as a camera 51, a sonar 52, a radar 53, a laser 54, and the like, which collect information on the outside of a vehicle, and an ADAS_ECU 50, which is an electronic control device for the ADAS, and has, for example, an above-mentioned BSW function 50a and the like.

A door opening/closing sensor 21, a door lock sensor 22, a smart key signal reception part 23, a driver sensing camera 24, a seat pressure sensor 25, and the like are vehicle exit detectors configured to detect that the occupant has got out of the vehicle.

A power supply control device 1 is configured to control electric power PSW from a battery PS, which is a power supply of the vehicle, thereby supplying electric power W1, W2, W3, W4, and W5 to a vehicle control device 100, the ADAS 5, the car navigation system 4, and the above-mentioned respective vehicle exit detectors 21 to 25.

The vehicle control device 100 is configured to carry out various types of control for the vehicle, and a description is herein given of control relating to power supply control by the power supply control device 1 according to the present invention.

For example, the vehicle control device 100 that can be constructed by, for example, a computer, is represented as function blocks.

A vehicle exit detection part 102 is configured to detect a timing at which the occupant gets out of the vehicle in accordance with vehicle exit detection signals Ds from the vehicle exit detectors 21 to 25 that are set in advance.

The vehicle control device 100 inputs an ignition key signal IKs representing an ignition power supply state (IG power supply state) and an accessory power supply state (ACC power supply state) from, for example, an ignition key IK.

A power supply control part 101 is configured to control the power supply by the power supply control device 1 in accordance with the state of the ignition key signal IKs.

A timer 110 is configured to count a period set in advance.

A description is now given of an example of an operation of the vehicle control device 100 when the occupant gets out of the vehicle.

When the ignition key signal IKs represents the IG power supply state, the power supply control part 101 inputs a control signal Cs to the power supply control device 1 to control the power supply control device 1 such that the electric power PSW is supplied from the battery PS as the electric power W1, W2, W3, W4, and W5 to the vehicle control device 100, the ADAS 5, the car navigation system 4, and the respective vehicle exit detectors 21 to 25.

When the ignition key signal IKs changes from the IG power supply state to the ACC power supply state, the power supply control part 101 controls the power supply control device 1 so as to shut off the power supply to a drive system of the vehicle, which is not shown, but so as to maintain supply of the electric power PSW from the battery PS as the electric power W1, W2, W3, W4, and W5 to the vehicle control device 100, the ADAS 5, the car navigation system 4, and the respective vehicle exit detectors 21 to 25.

Then, when the ignition key signal IKs changes from the ACC power supply state to an OFF state, the power supply control part 101 controls the power supply control device 1 so as to continuously supply power until the vehicle exit detection part 102 detects a timing at which the occupant gets out of the vehicle. When the timing is detected by the vehicle exit detection part 102 in accordance with the vehicle exit detection signals Ds from the vehicle exit detectors 21 to 25, the power supply control part 101 controls the power supply control device 1 so as to shut off the power supply or supply a standby voltage to at least the ADAS 5 and the car navigation system 4, which are the in-vehicle devices, thereby bringing those systems into a stop state or a sleep state.

Moreover, regarding the vehicle control device 100 and the respective vehicle exit detectors 21 to 25, the power supply control part 101 is configured to control the power supply control device 1 so as to continuously supply the power PSW from the battery PS to parts necessary for a next start operation of the vehicle, for example, the vehicle control device 100 and the smart key signal reception part 23, or to supply a standby voltage to those parts so as to bring the parts into the standby state, and apply the same power supply control as that applied to the in-vehicle devices 4 and 5 to the other parts.

Moreover, when a period set in advance is set to the timer 110, the power supply control part 101 controls the power supply control device 1 so as to delay the timing at which the power supply is shut off or the timing at which the standby voltage is supplied by the period set to the timer 110 after the vehicle exit detection part 102 detects the timing at which the occupant gets out of the vehicle.

A vehicle using a smart key SK similarly carries out the power supply control in accordance with a smart key signal SKs representing the IG power supply state or the ACC power supply state from the smart key SK received by the smart key signal reception part 23.

A description is now given of operations of respective parts. Referring to FIG. 1, the power supply control part 101 is configured to control the power supply control device 1 so as to generate the electric power W1, W2, and W3 from the electric power PSW of the battery PS, and supply the electric power W1, W2, and W3 so as to shut off the power supply or supply the standby voltage to the ADAS_ECU 50, the camera 51, the sonar 52, the radar 53, the laser 54, and the car navigation system 4 in accordance with the timing at which the occupant gets out of the vehicle depending on the ACC power supply state and values of vehicle exit detection flags Fn output by the respective vehicle exit detectors 21 to 25, thereby bringing those devices into the stop state or the sleep state.

Further, temporal control of the supply timings of the electric power W1, W2, and W3 is enabled by the timer 110. The vehicle exit detection part 102 is configured to determine whether or not the occupant has got out of the vehicle in accordance with output results of the door opening/closing sensor 21, the door lock sensor 22, the smart key signal reception part 23, the driver sensing camera 24, the seat pressure sensors 25, and the like, and set the vehicle exit detection flags Fn.

Figure 2:
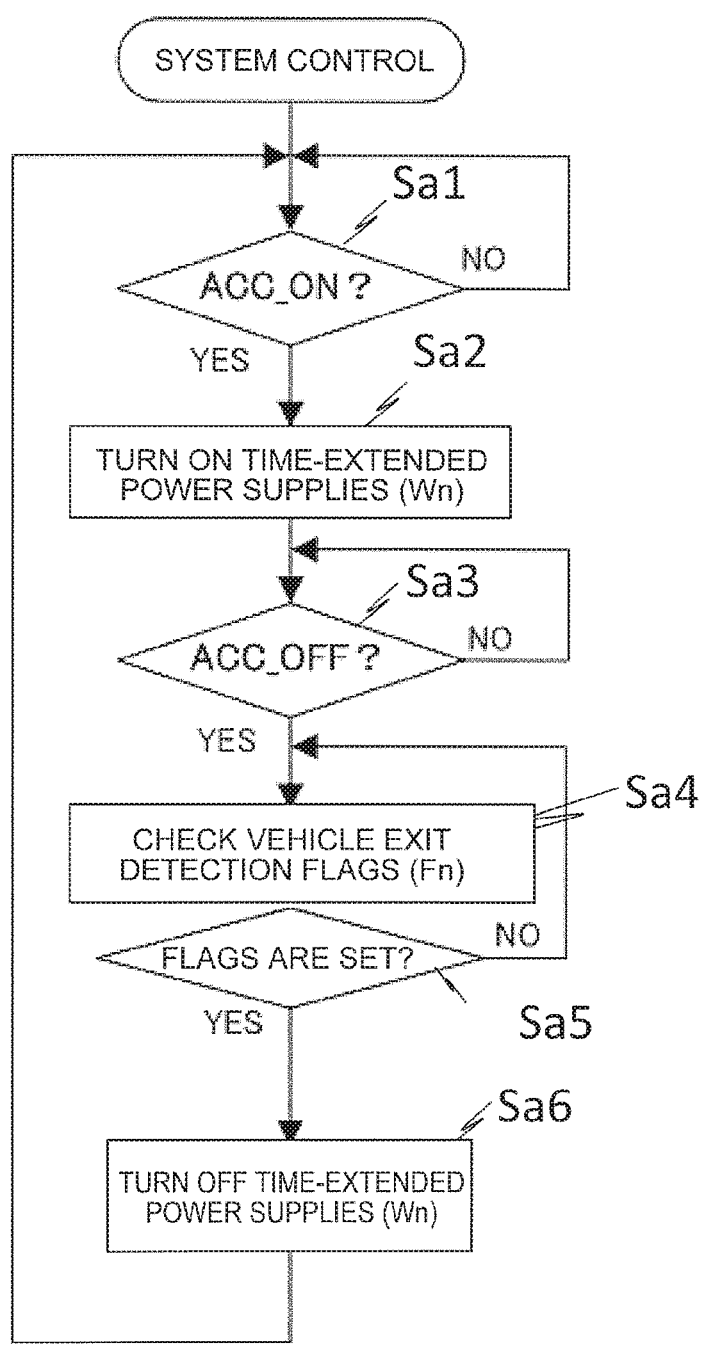
FIG. 2 is a flowchart for illustrating an operation relating to power supply control for the entire vehicle control device according to the embodiment of the present invention.
Figures 10, 11:
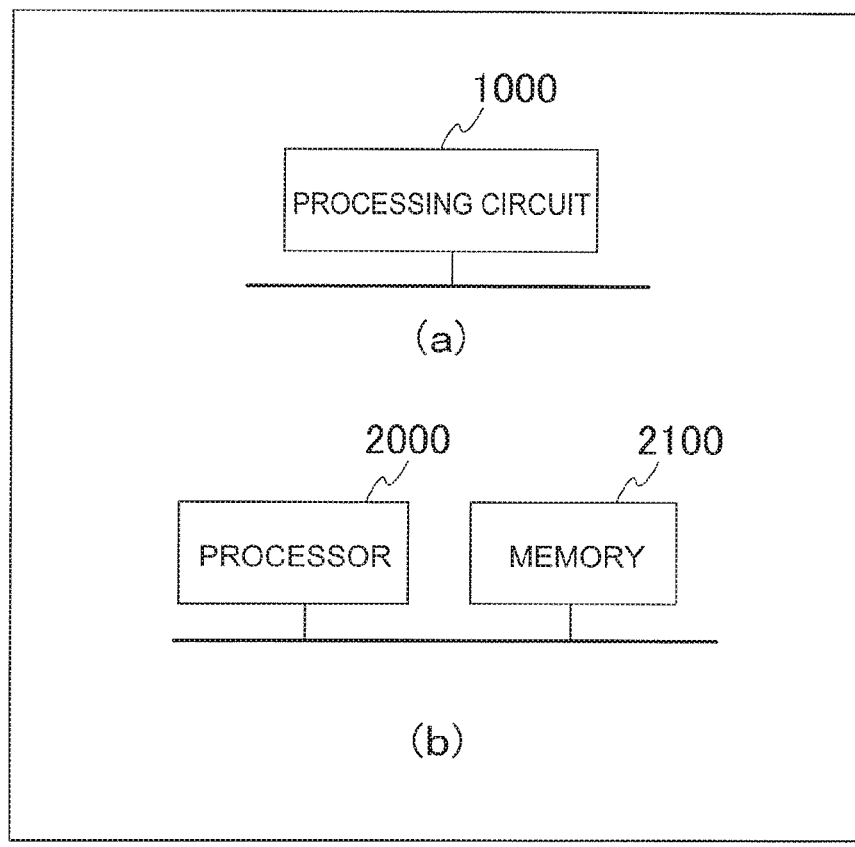
FIG. 10 is a diagram for illustrating examples of the vehicle exit detection flag in the vehicle control device according to the embodiment of the present invention.
FIG. 11 is a diagram for illustrating an example of a hardware configuration of a control part of the vehicle control device according to the embodiment of the present invention.

FIG. 2 is a flowchart for illustrating an operation relating to power supply control for the entire vehicle control device according to the embodiment of the present invention. FIG. 10 is a diagram for illustrating examples of the vehicle exit detection flag.

Referring to FIG. 2, the power supply control part 101 starts the ACC power supply state (Step Sa1), and starts time-extended power supplies Wn (Step Sa2). On this occasion, the time-extended power supply Wn refers to a power supply for continuing the power supply as it is when the IG power supply state changes to the ACC power supply state.

Then, the power supply control part 101 maintains the time-extended power supplies Wn until the ACC power supply state turns OFF (Step Sa3).

Then, the power supply control part 101 checks the vehicle exit detection flags F1 to F5 at the timing at which the ACC power supply state turns off (Step Sa4), determines that the occupant has got out of the vehicle when vehicle exit detection flags designated in advance out of the vehicle exit detection flags F1 to F5 are set (Step Sa5), and turns off the time-extended power supplies Wn (Step Sa6). On the contrary, when the vehicle exit detection flags have not been set, the power supply control part 101 continues the time-extended power supplies Wn (Step Sa4), and turns off the time-extended power supplies Wn when the vehicle exit detection flags are set (Step Sa6).

Figure 3:
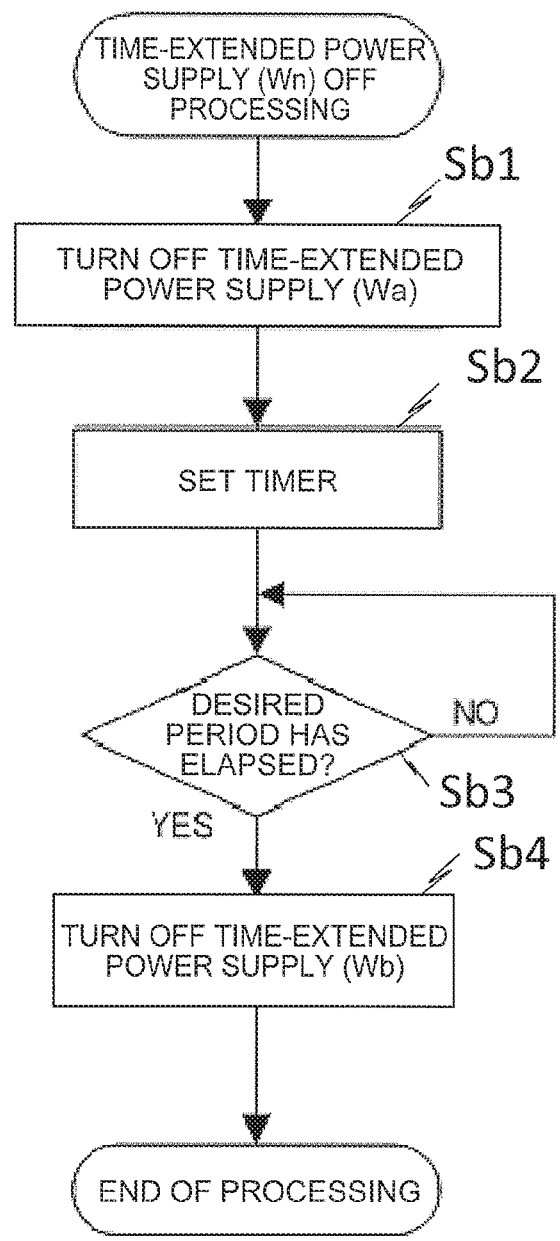
FIG. 3 is a processing flowchart when time-extended power supply is turned off by using a timer in the vehicle control device according to the embodiment of the present invention.

FIG. 3 is a processing flowchart when the time-extended power supplies Wn are turned off by using the timer 110. Referring to FIG. 3, after an arbitrary time-extended power supply Wa is turned off out of the time-extended power supplies Wn (Step Sb1), the timer 110 is set (Step Sb2), and after the desired set period has elapsed (Step Sb3), another time delay power supply Wb is turned off, and the processing is finished (Step Sb4).

Figure 4:
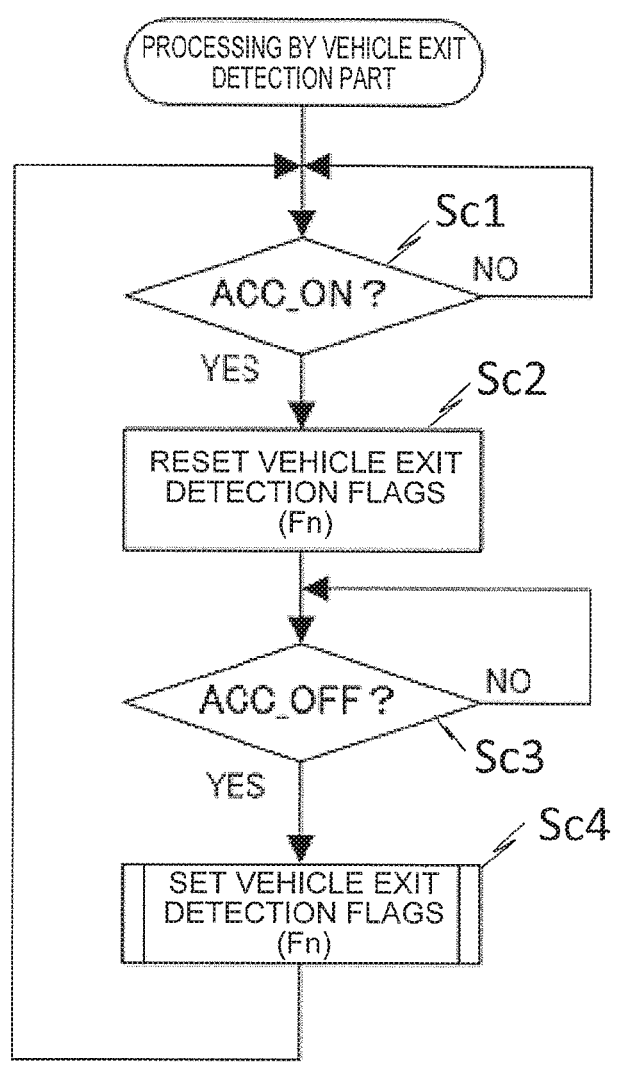
FIG. 4 is a processing flowchart for illustrating processing by a vehicle exit detection part in the vehicle control device according to the embodiment of the present invention.

FIG. 4 is a processing flowchart of the vehicle exit detection part 102. Referring to FIG. 4, in the vehicle exit detection part 102, the ACC power supply state is started (Step Sc1), the vehicle exit detection flags Fn are reset (Step Sc2), and when the ACC power supply state is turned off (Step Sc3), set processing is carried out for the respective vehicle exit detection flags Fn (Step Sc4).

FIG. 5 to FIG. 9 are flowcharts for illustrating the set processing for the vehicle exit detection flags Fn by the vehicle exit detection part 102. The vehicle exit detection part 102 is configured to determine the exit state of the occupant from the vehicle based on the vehicle exit detection signals Ds from the vehicle exit detectors 21 to 25. The vehicle exit detection signals Ds include a signal representing a state in which the door of the vehicle is opened, and then is closed, a signal representing a state in which the door of the vehicle is unlocked, and is then locked again, a signal representing a state in which a radio wave cannot be received from the smart key SK, a signal representing a state in which the detection signal for the occupant is absent, a signal representing a state in which the pressures of the seat pressure sensors are equal to less than a prescribed value on all the seats, and the like.

Figure 5:
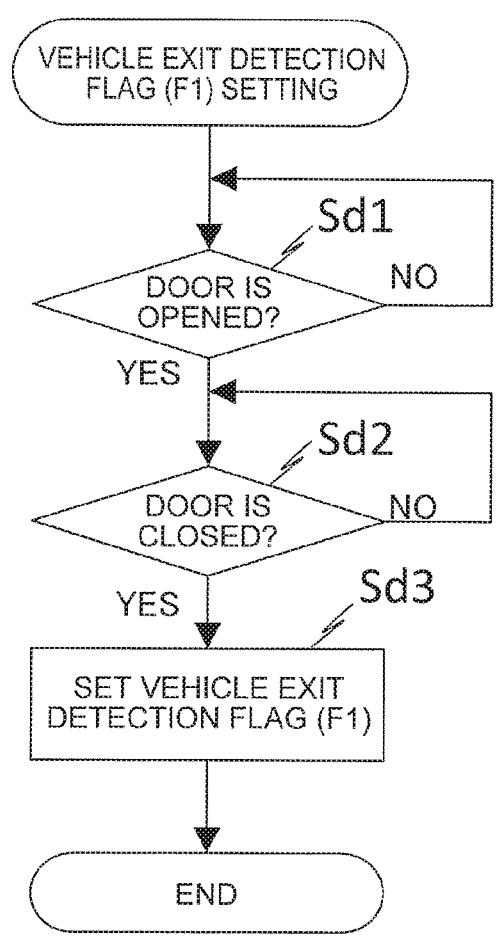
FIG. 5 is a flowchart for illustrating set processing for a vehicle exit detection flag in accordance with door opening/closing in the vehicle control device according to the embodiment of the present invention.

FIG. 5 is a flowchart for illustrating the set processing for the vehicle exit detection flag F1 in accordance with the opening and closing of the door, which relates to the door opening/closing sensor 21 configured to detect an open/closed state of the door of the vehicle. Referring to FIG. 5, when the door is confirmed to be opened (OPEN) after the ACC power supply state is turned off (Step Sd1), and then the door is confirmed to be closed (CLOSE) (Step Sd2), the occupant is determined to have got out of the vehicle, and the vehicle exit detection flag F1 is set to finish the detection processing (Step Sd3).

Figure 6:
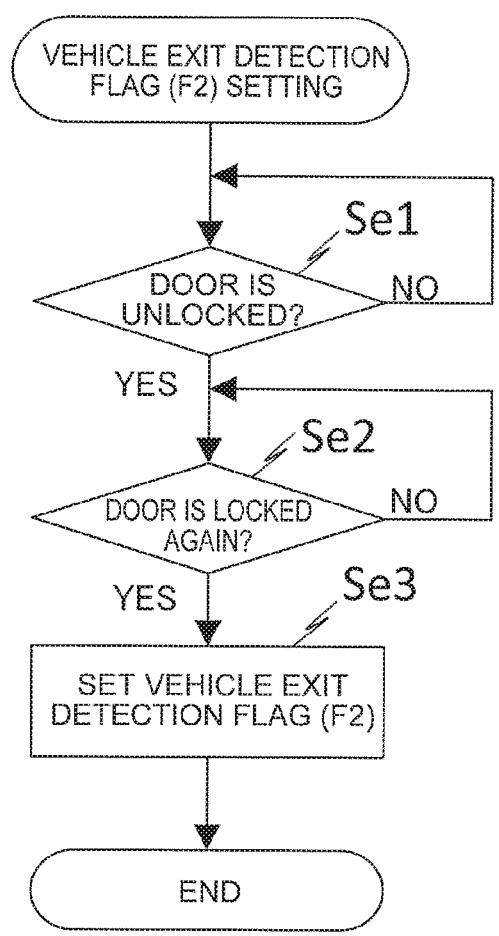
FIG. 6 is a flowchart for illustrating set processing for a vehicle exit detection flag in accordance with a door lock in the vehicle control device according to the embodiment of the present invention.

FIG. 6 is a flowchart for illustrating the set processing for the vehicle exit detection flag F2 in accordance with a door lock, which relates to the door lock sensor 22 configured to detect the lock state of the key of the door of the vehicle. Referring to FIG. 6, when the door is confirmed to be unlocked after the ACC power supply state is turned off (Step Se1), and then the door is confirmed to be locked again (Step Se2), the occupant is determined to have got out of the vehicle, and the vehicle exit detection flag F2 is set to finish the detection processing (Step Se3).

Figure 7:
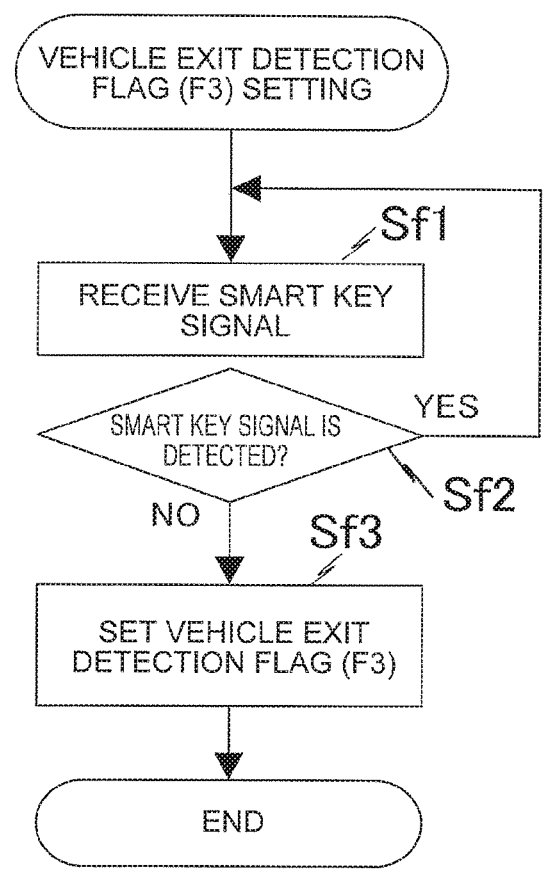
FIG. 7 is a flowchart for illustrating set processing for a vehicle exit detection flag in accordance with smart key signal reception in the vehicle control device according to the embodiment of the present invention.

FIG. 7 is a flowchart for illustrating the set processing for the vehicle exit detection flag F3 in accordance with the smart key signal reception, which relates to the smart key signal reception part 23 configured to receive the radio wave transmitted from the smart key SK. Referring to FIG. 7, the radio wave is received from the smart key SK after the ACC power supply state is turned off (Step Sf1), the occupant is determined to have got out of the vehicle when the reception of the radio wave stops (Step Sf2), and the vehicle exit detection flag F3 is set to finish the detection processing (Step Sf3).

Figure 8:
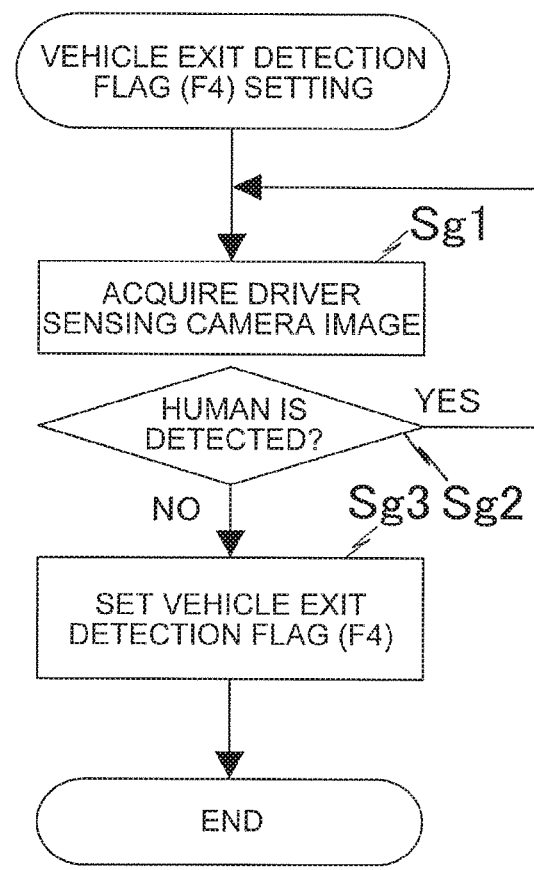
FIG. 8 is a flowchart for illustrating set processing for a vehicle exit detection flag in accordance with image recognition by a driver sensing camera in the vehicle control device according to the embodiment of the present invention.

FIG. 8 is a flowchart for illustrating the set processing for the vehicle exit detection flag F4 by image recognition carried out by the driver sensing camera, which relates to the driver sensing camera 24 configured to monitor a driver and an inside of a vehicle cabin. Referring to FIG. 8, after the ACC power supply state is turned off, the human (occupant) is detected by the image recognition carried out by the driver sensing camera (Step Sg1), the occupant is determined to have got out of the vehicle when the occupant is confirmed to be no longer detected (Step Sg2), and the vehicle exit detection flag F4 is set to finish the detection processing (Step Sg3).

Figure 9:
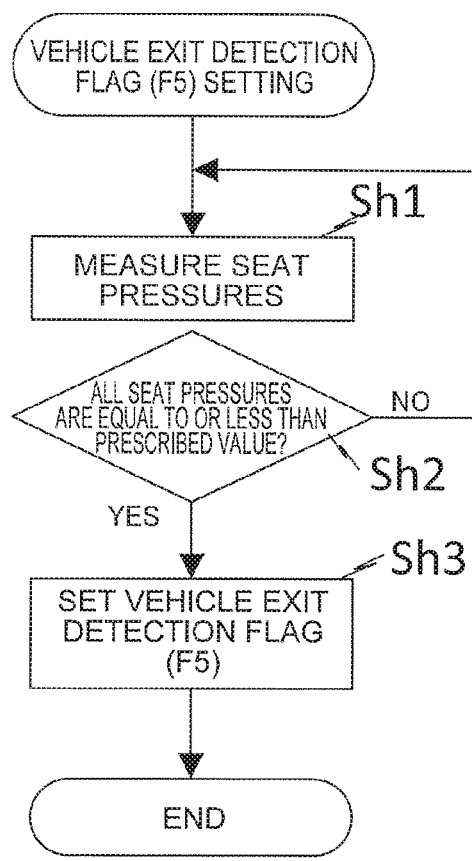
FIG. 9 is a flowchart for illustrating set processing for a vehicle exit detection flag in accordance with seat pressure sensors installed under seats in the vehicle control device according to the embodiment of the present invention.

FIG. 9 is a flowchart for illustrating the set processing for the vehicle exit detection flag F5 through use of the seat pressure sensors installed under the seats, which relates to the seat pressure sensors 25 configured to detect whether or not the occupant is seated on the seats. Referring to FIG. 9, after the ACC power supply state is turned off, the pressure on the seat pressure sensor is measured (Step Sh1), and when the pressure is equal to or less than a prescribed value on each of the seats, the occupant is determined to have got out of the vehicle (Step Sh2), and the vehicle exit flag F5 is set to finish the detection processing (Step Sh3).

It is only necessary to carry out at least one of the pieces of set processing for the vehicle exit detection flags Fn illustrated in FIG. 5 to FIG. 9, but a plurality of the pieces of set processing may be combined and a logical AND thereof may be calculated.

The power supply control part 101, the vehicle exit detection part 102, and the timer 110 of the vehicle control device 100 of FIG. 1, and the ADAS_ECU 50 of the ADAS 5 may be constructed by independent control circuits, or may collectively be constructed by one control circuit.

In this respect, each of processing circuits for achieving those functions may be configured by dedicated hardware, or may be configured by a central processing unit (CPU; referred to also as "processing unit", "arithmetic unit", "microprocessor", "microcomputer", "processor", or "DSP") for executing a program stored in a memory.

In FIG. 11 for schematically illustrating hardware configurations, part (a) indicates a case where those functions are configured by hardware, and part (b) indicates a case where those functions are configured by software.

When the functions of the respective components described above are configured by hardware illustrated in part (a) of FIG. 11, a processing circuit 1000 corresponds to, for example, a single circuit, a composite circuit, a processor including a program, a processor including a parallel program, ASIC, FPGA, or a combination of those. Each of the functions of the respective components described above may be achieved by the processing circuit, or the functions of the respective components may be collectively achieved by the processing circuit.

When the functions of the respective components described above are configured by the CPU illustrated in part (b) of FIG. 11, the functions of the respective components described above are achieved by software, firmware, or a combination of software and firmware. The software and the firmware are described as programs, and stored in a memory 2100. The processor 2000 being the processing circuit reads and executes the programs stored in the memory 2100, to thereby realize the functions of the respective components. In other words, those programs cause a computer to execute a procedure and a method for the respective components described above. The memory 2100 corresponds to, for example, a non-volatile or volatile semiconductor memory, for example, a RAM, a ROM, a flash memory, an EPROM, or an EEPROM, or a magnetic disk, a flexible disk, an optical disc, a compact disc, a MiniDisc, or a DVD.

The functions of the respective components described above may be partially achieved by the dedicated hardware, and may be partially achieved by the software or the firmware.

In this manner, the processing circuit can achieve the respective functions described above by the hardware, the software, the firmware, or the combination of those.

Further, different kinds of information required for the processing are set in advance in a circuit in the case of a hardware configuration, and are stored in advance in a memory in the case of a software configuration.

As described above, with the vehicle control device and the vehicle control method according to the present invention, the functions of the in-vehicle devices, which have hitherto been stopped when the accessory power supply state (ACC) is finished, can be continued until the occupant gets out of the vehicle. As a result, for example, the BSW function can be used without being stopped, and the alarm can be issued for vehicles approaching from the rear and the side of the vehicle when the occupant gets out of the vehicle and the door is opened and closed.

What is claimed is:

1. A vehicle control device, comprising:
a vehicle exit detector configured to detect a timing at which an occupant gets out of a vehicle in accordance with a vehicle exit detection signal from a vehicle exit detection device;
a power supply controller configured to, when the timing at which the occupant gets out of the vehicle is detected by the vehicle exit detector, send a control signal to a power supply control device, wherein the control signal commands the power supply control device to shut off a power supply to an in-vehicle device installed on the vehicle, and bring the in-vehicle device into a stop state; or commands the power supply device to supply a standby voltage to the in-vehicle device and bring the in-vehicle device into a sleep state,
an advanced driving assistant system (ADAS) as the in-vehicle device,
wherein the vehicle exit detector comprises a door opening/closing sensor configured to detect an open/closed state of a door of the vehicle,
wherein the power supply controller is further configured to control the power supply control device to shut off the power supply to the in-vehicle device or supply the standby voltage to the in-vehicle device, when the door opening/closing sensor detects that the door of the vehicle is opened and then closed consecutively,
wherein the vehicle control device further comprises a timer,
wherein the power supply controller is configured to control the power supply control device so as to delay one of a timing at which the power supply is shut off and a timing at which the standby voltage is supplied by a period set in advance in accordance with the timer after the vehicle exit detector detects that the occupant has got out of the vehicle, and
wherein the power supply controller is further configured to control the power supply control device to supply the standby voltage to the ADAS so that the ADAS enters into the sleep state when the vehicle exit detector detects that the occupant has left the vehicle.

2. The vehicle control device according to claim 1, wherein the ADAS has a blind spot warning (BSW) function.

3. A vehicle control device, comprising:
a vehicle exit detector configured to detect a timing at which an occupant gets out of a vehicle in accordance with a vehicle exit detection signal from a vehicle exit detection device; and
a power supply controller configured to, when the timing at which the occupant gets out of the vehicle is detected by the vehicle exit detector, send a control signal to a power supply control device, wherein the control signal commands the power supply control device to shut off a power supply to an in-vehicle device installed on the vehicle and bring the in-vehicle device into a stop state, or commands the power supply control device to supply a standby voltage to the in-vehicle device and bring the in-vehicle device into a sleep state;
an advanced driving assistant system (ADAS) as the in-vehicle device; and
a timer,
wherein the power supply controller is further configured to control the power supply control device to shut off the power supply to the ADAS when the vehicle exit detector detects that the occupant has left the vehicle, and
wherein the power supply controller is configured to control the power supply control device so as to delay one of a timing at which the power supply is shut off and a timing at which the standby voltage is supplied by a period set in advance in accordance with the timer after the vehicle exit detector detects that the occupant has got out of the vehicle, and
wherein the ADAS has a blind spot warning (BSW) function.

4. A vehicle control method, comprising:
detecting a timing at which an occupant gets out of a vehicle in accordance with a vehicle exit detection signal from a vehicle exit detection device; and
carrying out, when the timing at which the occupant gets out of the vehicle is detected, any one of: shutting off a power supply to an in-vehicle device installed on the vehicle, thereby bringing the in-vehicle device into a stop state; and supplying a standby voltage to the in-vehicle device, thereby bringing the in-vehicle device into a sleep state, wherein the in-vehicle device comprises an advanced driving assistant system (ADAS), wherein the detecting comprises detecting an open/closed state of a door of the vehicle, wherein the carrying out any one of the shutting off the power supply and the supplying the standby voltage comprises:
- shutting off the power supply to the in-vehicle device or supplying the standby voltage to the in-vehicle device, when detecting that the door of the vehicle is opened and then closed consecutively,
- controlling a power supply control device so as to delay one of a timing at which the power supply is shut off and a timing at which the standby voltage is supplied by a period set in advance in accordance with the timer after detecting that the occupant has got out of the vehicle, and
- controlling the power supply control device to supply the standby voltage to the ADAS so that the ADAS enters into the sleep state, upon detecting that the occupant has left the vehicle.

5. A vehicle control device, comprising:
a vehicle exit detector configured to detect a timing at which an occupant gets out of a vehicle in accordance with a vehicle exit detection signal from a vehicle exit detection device; and
a power supply controller configured to, when the timing at which the occupant gets out of the vehicle is detected by the vehicle exit detector, send a control signal to a power supply control device, wherein the control signal commands the power supply control device to shut off a power supply to an in-vehicle device installed on the vehicle, and bring the in-vehicle device into a stop state; or commands the power supply device to supply a standby voltage to the in-vehicle device and bring the in-vehicle device into a sleep state,
wherein the vehicle exit detector comprises a door opening/closing sensor configured to detect an open/closed state of a door of the vehicle,
wherein the power supply controller is further configured to control the power supply control device to shut off the power supply to the in-vehicle device or supply the standby voltage to the in-vehicle device, when the door opening/closing sensor detects that the door of the vehicle is opened and then closed consecutively,
wherein the vehicle control device further comprises a timer,
wherein the power supply controller is configured to control the power supply control device so as to delay one of a timing at which the power supply is shut off and a timing at which the standby voltage is supplied by a period set in advance in accordance with the timer after the vehicle exit detector detects that the occupant has got out of the vehicle,
wherein the vehicle exit detector comprises a door lock sensor configured to detect a lock state of a key of the door of the vehicle, and
wherein the power supply controller is further configured to control the power supply control device to shut off the power supply to the in-vehicle device or supply the standby voltage to the in-vehicle device, when the door lock sensor detects that the door of the vehicle is unlocked and then locked consecutively.

6. A vehicle control device, comprising:
a vehicle exit detector configured to detect a timing at which an occupant gets out of a vehicle in accordance with a vehicle exit detection signal from a vehicle exit detection device; and
a power supply controller configured to, when the timing at which the occupant gets out of the vehicle is detected by the vehicle exit detector, send a control signal to a power supply control device, wherein the control signal commands the power supply control device to shut off a power supply to an in-vehicle device installed on the vehicle, and bring the in-vehicle device into a stop state; or commands the power supply device to supply a standby voltage to the in-vehicle device and bring the in-vehicle device into a sleep state,
wherein the vehicle exit detector comprises a door opening/closing sensor configured to detect an open/closed state of a door of the vehicle,
wherein the power supply controller is further configured to control the power supply control device to shut off the power supply to the in-vehicle device or supply the standby voltage to the in-vehicle device, when the door opening/closing sensor detects that the door of the vehicle is opened and then closed consecutively,
wherein the vehicle control device further comprises a timer,
wherein the power supply controller is configured to control the power supply control device so as to delay one of a timing at which the power supply is shut off and a timing at which the standby voltage is supplied by a period set in advance in accordance with the timer after the vehicle exit detector detects that the occupant has got out of the vehicle,
wherein the vehicle exit detector comprises a smart key signal reception part configured to receive a radio wave transmitted from a smart key, and
wherein the power supply controller is further configured to control the power supply control device to shut off the power supply to the in-vehicle device or supply the standby voltage to the in-vehicle device, when the smart key signal reception part detects the radio wave transmitted from the smart key after an accessory power supply is turned off.

7. A vehicle control device, comprising:
a vehicle exit detector configured to detect a timing at which an occupant gets out of a vehicle in accordance with a vehicle exit detection signal from a vehicle exit detection device; and
a power supply controller configured to, when the timing at which the occupant gets out of the vehicle is detected by the vehicle exit detector, send a control signal to a power supply control device, wherein the control signal commands the power supply control device to shut off a power supply to an in-vehicle device installed on the vehicle, and bring the in-vehicle device into a stop state; or commands the power supply device to supply a standby voltage to the in-vehicle device and bring the in-vehicle device into a sleep state,
wherein the vehicle exit detector comprises a door opening/closing sensor configured to detect an open/closed state of a door of the vehicle,
wherein the power supply controller is further configured to control the power supply control device to shut off the power supply to the in-vehicle device or supply the standby voltage to the in-vehicle device, when the door opening/closing sensor detects that the door of the vehicle is opened and then closed consecutively, wherein the vehicle control device further comprises a timer, wherein the power supply controller is configured to control the power supply control device so as to delay one of a timing at which the power supply is shut off and a timing at which the standby voltage is supplied by a period set in advance in accordance with the timer after the vehicle exit detector detects that the occupant has got out of the vehicle, wherein the vehicle exit detector comprises a driver sensing camera configured to monitor a driver and an inside of a vehicle cabin, and wherein the power supply controller is further configured to control the power supply control device to shut off the power supply to the in-vehicle device or supply the standby voltage to the in-vehicle device, when the driver sensing camera detects the occupant after an accessory power supply is turned off.

8. A vehicle control device, comprising:

a vehicle exit detector configured to detect a timing at which an occupant gets out of a vehicle in accordance with a vehicle exit detection signal from a vehicle exit detection device; and a power supply controller configured to, when the timing at which the occupant gets out of the vehicle is detected by the vehicle exit detector, send a control signal to a power supply control device, wherein the control signal commands the power supply control device to shut off a power supply to an in-vehicle device installed on the vehicle, and bring the in-vehicle device into a stop state; or commands the power supply device to supply a standby voltage to the in-vehicle device and bring the in-vehicle device into a sleep state, wherein the vehicle exit detector comprises a door opening/closing sensor configured to detect an open/closed state of a door of the vehicle, wherein the power supply controller is further configured to control the power supply control device to shut off the power supply to the in-vehicle device or supply the standby voltage to the in-vehicle device, when the door opening/closing sensor detects that the door of the vehicle is opened and then closed consecutively, wherein the vehicle control device further comprises a timer, wherein the power supply controller is configured to control the power supply control device so as to delay one of a timing at which the power supply is shut off and a timing at which the standby voltage is supplied by a period set in advance in accordance with the timer after the vehicle exit detector detects that the occupant has got out of the vehicle, wherein the vehicle exit detector comprises a seat pressure sensor configured to measure a seat pressure to detect whether or not the occupant is seated on a seat, and wherein the power supply controller is further configured to control the power supply control device to shut off the power supply to the in-vehicle device or supply the standby voltage to the in-vehicle device, when the seat pressure measured after an accessory power supply is turned off is less than or equal to a prescribed pressure value.

* * * * *